United States Patent [19]

Busch et al.

[11] 4,178,271
[45] Dec. 11, 1979

[54] SHEET-LIKE STRUCTURE OF POLYVINYL CHLORIDE, WHICH IS CAPABLE OF ABSORBING WATER VAPOR AND TRANSMITTING WATER VAPOR

[75] Inventors: Walter Busch; Arno Holst, both of Wiesbaden; Wilhelm Fischer, Pirmasens, all of Fed. Rep. of Germany

[73] Assignee: Hoechst Aktiengesellschaft, Fed. Rep. of Germany

[21] Appl. No.: 863,447

[22] Filed: Dec. 22, 1977

[30] Foreign Application Priority Data

Dec. 24, 1976 [LU] Luxembourg .......................... 76471

[51] Int. Cl.² ............................ C08L 1/28; C08L 3/08
[52] U.S. Cl. ............................ 260/17 R; 204/159.12; 204/159.14; 204/160.1; 204/159.2; 260/17 A; 260/17.4 R; 260/17.4 CL; 260/17.4 GC; 260/17.4 ST; 260/17.4 UC; 428/532; 428/904; 428/913
[58] Field of Search ....... 260/17 R, 17.4 ST, 17.4 UC

[56] References Cited

U.S. PATENT DOCUMENTS

| | | | |
|---|---|---|---|
| 3,137,664 | 6/1964 | Shulman et al. .......................... | 260/9 |
| 3,488,302 | 6/1970 | Pyron .......................... | 260/9 |
| 3,992,495 | 11/1976 | Sano et al. .......................... | 204/160.1 |

FOREIGN PATENT DOCUMENTS

| | | | |
|---|---|---|---|
| 558218 | 6/1958 | Canada .......................... | 260/9 |
| 948762 | 2/1964 | United Kingdom .......................... | 204/159.12 |

Primary Examiner—Edward M. Woodberry
Attorney, Agent, or Firm—James E. Bryan

[57] ABSTRACT

This invention relates to a sheet-like structure of polyvinyl chloride or a copolymer of vinyl chloride, which is capable of absorbing water vapor and transmitting water vapor, with a uniformly incorporated additive composed of polymeric particles of at least one swellable, modified polymer. The invention also relates to a process for manufacturing the sheet-like structure.

3 Claims, 5 Drawing Figures

FIG. 1

SHEET-LIKE STRUCTURE OF POLYVINYL CHLORIDE, WHICH IS CAPABLE OF ABSORBING WATER VAPOR AND TRANSMITTING WATER VAPOR

The present invention relates to a sheet-like structure of polyvinyl chloride or a copolymer of vinyl chloride, which has an improved absorption capacity and water vapor transmission rate, and to processes for the manufacture of these sheet-like structures.

Sheet-like structures of this type are used in various fields of technology; these include, for example, the use as leather substitutes (synthetic leather) for shoe upper material, upholstery covers and outer garments (leather garments and all-weather garments), and also as a tent material and for other covers. Processes for the manufacture of such sheet-like structures which are produced in most cases as self-supporting films or as multi-layer sheet-like structures (for example composed of a covering layer and a carrier layer) have been known for a long time (see, for example, Kunststoffhandbuch "Plastics Handbook", Volume II, parts 1 and 2, "Polyvinyl Chloride" by K. Krekeler and G. Wick, Carl Hanser Verlag, Munich 1963). When these sheet-like structures are employed in one of the fields of application mentioned, it is one of the decisive demands made of the material that it be capable of absorbing water vapor and transmitting water vapor in order to provide, for example on the body, comfortable wearing and a good wearing climate.

To obtain these required properties, three processes are primarily used (see, for example, B. M. Murphy, "Adsorptives Vinyl—Ein neues Schuhmaterial (Absorptive Vinyl—a new Show Material)", J. Coated Fabrics, Volume 4, page 240 et seq., 1975.

1. Incorporation of soluble materials into the PVC and preparation of a film or a coating from the mixture by molding or a plastisol technology and solvent extraction of the finished sheet-like structure. The problem in this process is, above all, the washing-out step and the associated handling of large quantities of solvent.

2. A chemical or mechanical expansion of PVC plastisol with the aid of foam stabilizers. The problems with the products manufactured in this way are, in particular, the poor physical properties (for example abrasion resistance and extension properties).

3. Controlled sintering of a few PVC particles; in this process, however, very stringent demands are made on the control of the reaction conditions.

In the article, mentioned in the previous section, "Adsorptives Vinyl—Ein neues Schuhmaterial (Absorptive Vinyl—a new Shoe Material)" a process for the manufacture of this material is also described on page 242. A microporous sheet-like structure which can absorb and transport water vapor and liquid water is produced by gelling from a PVC plastisol and an addition of finely particulate thermoplastic fillers. The material can be used as an inner lining for shoes, in particular shoes of synthetic upper material.

German Pat. No. 967,403, discloses a process for the manufacture of a breathing synthetic leather from polyvinyl chloride (PVC), in the course of which process small amounts of high molecular weight organic substances which are swellable in water or organic solvents are incorporated in the customary anhydrous coatings containing PVC, plasticizer and pigment dyes, these substances being swollen in a little water or solvent. This composition is processed in the customary manner by applying heat to produce sheets, or fabrics or non-woven webs are coated therewith; the following substances are proposed: starch, viscose, casein, gelatin, agar-agar, polyvinyl alcohol, polyamides, cellulose ethers and esters, polystyrene or other polyvinyl compounds. It is stated that the hydrophilic character of the synthetic leather material also can be controlled by admixing hydrophilic capillary-active fillers, such as, for example, cellulose fibers.

DT-AS No. 1,014,960, discloses a process for the manufacture of synthetic leather which transmits air and gas. In this process, a filler which is swellable in water is uniformly incorporated into a mixture which contains one or more polymerizable organic compounds, for example unpolymerized and/or partially polymerized vinyl compounds. Advantageously, this filler, for example a swellable fiber material or starch, is to be impregnated with concentrated solutions of substances which are insoluble in the liquid, pasty mixtures and which decompose when hot with the formation of gases or are washed out with water. The mixture is polymerized before or after it has been applied to a textile base.

A process for the manufacture of sheet-like structures which transmit water vapor and air is disclosed in Swiss Pat. No. 328,436. In this process, a paste which contains a polymer or copolymer of vinyl chloride is mixed with polyvinyl compounds which are composed at least in part of vinyl alcohol units ($-CH_2-CHOH-$) and which are dissolved in a vaporizable liquid. This mixture is spread out in a layer and the latter is subjected to a heat treatment, as a result of which the vaporizable liquid is evaporated and the composition gels. It should be possible to render the hydrophilic component, before, during or after the heat treatment, either sparingly soluble, insoluble or less swellable, for example by tanning, acetalization or cross-linking, so that it is not partially swollen or dissolved and washed out in an undesirable manner during the subsequent action of water. A treatment with water before or after gelling is considered to be very advantageous, and in some cases may even be essential.

DT-OS No. 2,364,628 discloses a structure, rendered hydrophilic, of a fiber-forming and a film-forming water-insoluble polymer, which contains particles of a modified cellulose ether. The following are mentioned as polymers: regenerated cellulose (cellulose hydrate), cellulose acetate, polyalkylene, alkylcellulose, polyacrylonitrile, polyamide and polyester. The modified cellulose ethers are those, of which the mere degree of etherification would lead to water-soluble cellulose ethers and which are modified in such a way that, at least for the major part, they have become water-insoluble but have remained capable of absorbing water. The structure, rendered hydrophilic, carries the particles of modified cellulose ether in uniform distribution in its polymeric mass or has a surface covered by the particles. The uses as ion exchangers or as dialysis membranes or osmosis membranes are mentioned as technological fields of application for films manufactured in this way.

It is the object of the present invention to provide a sheet-like structure, based on polyvinyl chloride (PVC) or corresponding copolymers, which is capable of absorbing water vapor and transmitting water vapor and which is improved as compared with the state of the art.

The invention starts from a sheet-like structure of polyvinyl chloride or a copolymer obtained with vinyl chloride, which is capable of absorbing water vapor and transmitting water vapor, with a uniformly incorporated additive composed of polymeric particles. The sheet-like structure according to the invention comprises, as the additive, particles of at least one swellable, modified polymer. Swellable polymers are those which swell in aqueous liquids, in particular liquids having a water content of more than 50% by weight, or which swell as a result of water molecules coming into contact with them by other means (for example water vapor). The term "uniformly incorporated" is here to be understood as a statistical distribution. The polymer is insoluble in water, in particular to the extent of at least 50% by weight. Advantageously, the particles are of a size of $\leq 250$ μm, preferably of $\leq 150$ μm, and are in general present in a pulverulent or fibrous form.

In a preferred embodiment, the sheet-like structure contains about 10 to 30% by weight of the additive of the particles composed of at least one swellable, modified polymer.

The following, for example, are suitable as swellable, modified, polymers for the additive in the materials according to the invention:

Cross-linked polyalkylene oxide according to DT-OS No. 2,048,721; in the process for the manufacture of this product, water-soluble polyalkylene oxides are treated with ionizing radiation of sufficient intensity to effect cross-linking and to render the polymer insoluble. The polyalkylene oxide can here be irradiated in the solid state or in solution.

The absorbent, cross-linked copolymer containing carboxyl groups according to DT-OS No. 2,507,011, obtained from an α,β-unsaturated acid and an acetal of the general formula $(CH_2=CH-CH_2-O)_2-CH-(CH_2)_n-CH-(O-CH_2-CH=CH_2)_2$ where n is 0, 1 or 2. Acrylic acid, methacrylic acid, itaconic acid, α-phenylacrylic acid or α-benzylacrylic acid are here particularly suitable as the α,β-unsaturated acid; in the manufacture of this copolymer, 0.1% to 15% by weight of the acetal are advantageously used per 85% to 99.9% by weight of one of the unsaturated acids.

A hydrocolloidal polymer according to U.S. Pat. No. 3,670,731 (=DT-OS No. 1,642,072), which has been rendered water-insoluble by cross-linking and is suitable for absorbing liquids and also retaining them; certain polyacrylamides, alkali metal salts of hydrolyzed polyacrylamides and alkali metal salts of polystyrene sulfonic acids are mentioned in particular.

A cross-linked, insoluble, physiologically harmless polymer, which is swellable in water, according to U.S. Pat. No. 3,669,103 (=DT-OS No. 1,617,998), selected from the group comprising poly-N-vinylpyrrolidones, polyacrylamides, polyacrylic acid and polyglycols.

Absorbent polymers which are, at least for the major part, water-insoluble and swellable with water and which have been manufactured by the process of German application No. P 25 41 035.9; these are manufactured by etherification, in a homogeneous phase, of polyhydroxymethylene in an aqueous-alkaline solution with an α-halogenocarboxylic acid and by reaction, before, during or after the etherification, with a cross-linking agent which in an alkaline medium is polyfunctional towards polyhydroxymethylene.

In particular, the following swellable, modified carbohydrate derivatives can be used within the scope of the invention: alkali metal salts of carboxymethylcellulose, which are heat-treated and are swellable in water, according to U.S. Pat. No. 2,639,239; in the process for the manufacture of this product, the solubility of a water-soluble alkali metal salt of carboxymethylcellulose having a D. S. (=degree of substitution, i.e., the number of substituted hydroxyl groups on one anhydro-D-glucose unit) of 0.5 up to about 1 is reduced by subjecting this dry salt, in finely divided form, to a temperature of about 130° to about 210° C., with highly swellable gel particles being obtained.

Water-insoluble, heat-treated carboxyalkyl celluloses, which absorb and retain liquids, according to U.S. Pat. No. 3,723,413 (=DT-OS No. 2,314,689); in the process for the manufacture of these products the procedure is that (a) cellulose materials are treated with carboxyalkylating reactants and in this way water-soluble carboxyalkylcellulose is formed which has an average degree of substitution of more than 0.35 carboxyalkyl radicals per anhydroglucose unit in the cellulose but which possesses poor properties with respect to the absorption and retention of liquids, (b) such a proportion of the carboxyalkylating reactants and the by-products formed during the reaction is removed that, relative to the weight of the water-soluble carboxyalkylcellulose, at least about 3% by weight thereof remain and (c) the carboxyalkylcellulose is subjected to a heat treatment in the presence of the remaining carboxyalkylating reactants and by-products of the reaction and, thus, is rendered water-insoluble, and excellent properties with respect to the absorption and retention of liquids are imparted to the carboxyalkylcellulose.

Absorbent carboxymethylcellulose fibers which are suitable for use in fiber materials for absorbing and retaining aqueous solutions and are substantially water-insoluble, according to U.S. Pat. No. 3,589,364 (=DT-OS No. 1,912,740); fibers of this type consist of wet-cross-linked fibers of water-soluble salts of carboxymethylcellulose having a D.S. of about 0.4 to 1.6 and possess the original fiber structure. Preferably, about 3–10% by weight of epichlorohydrin are employed as the cross-linking agent.

Chemically cross-linked, swellable cellulose ethers, according to U.S. Pat. No. 3,936,441 (=DT-OS No. 2,357,079); these cross-linked cellulose ethers, in particular those obtained from carboxymethylcellulose, carboxymethylhydroxyethylcellulose, hydroxyethylcellulose or methylhydroxyethylcellulose, are manufactured by reacting the ethers, which in themselves are water-soluble, in an alkaline reaction medium with a cross-linking agent, the functional groups of which are the acrylamido group the chloro-azomethine group the allyloxy-azomethine group or which is dichloroacetic acid or phosphorous oxychloride.

Chemically modified, swellable cellulose ethers, according to U.S. Pat. No. 3,965,091 (=DT-OS No. 2,358,150); these cellulose ethers which have not been modified by cross-linking are manufactured by reacting the ethers, which in themselves are water-soluble, in an alkaline reaction medium with a monofunctionally reacting compound which is described by one of the two general formulae which follow:

wherein $R_1$ in the formula I denotes an hydroxyl group, an acylamino group or an esterified carbamino group, and $R_2$ denotes hydrogen or a carboxyl group.

Chemically cross-linked, swellable cellulose ethers, according to DT-OS No. 2,519,927; these cross-linked cellulose ethers are manufactured by reacting the ethers, which in themselves are water-soluble, in an alkaline reaction medium with bis-acrylamido-acetic acid as the cross-linking agent.

Free-flowing, hydrophilic carbohydrates, which are cross-linked by radiation and are swellable in water, according to DT-AS No. 2,264,027; these products are manufactured (in the case of certain other polymers, such as polyethylene oxide or polyvinyl alcohol, similar products also can be obtained by the reaction steps which follow) by:

(a) mixing at least one water-soluble, pulverulent polymeric carbohydrate with such an amount of at least one pulverulent inert filler, the particles of which are smaller than those of the carbohydrate, and in such a way that a substantial part of the surface of the pulverulent carbohydrate is covered, (b) while the mixing is continued, contacting the mixture, while stirring thoroughly, with a finely divided water spray in such an amount that the mixture is preserved in the form of free-flowing particles, and (c) then subjecting the resulting mixture to ionizing radiation until the polymeric carbohydrate is cross-linked.

Chemically cross-linked or otherwise modified swellable starch ethers, according to German application No. P 26 34 539.1; these special starch ethers are manufactured by, for example, carrying out, as the modification, a cross-linking with a cross-linking agent which carries the following functional group which is reactive towards hydroxyl groups:

the acrylamido group, $R_1$ being H or $CH_3$, or

-continued an α-halogenoepoxy group, Hal being Cl or Br, or the chloro-azomethine group, or $-\overline{N}=C-\overline{O}-C-C=CH_2$ the allyloxy-azomethine group or which is phosphorous oxychloride. The procedure in another mode of manufacture is that the modification is carried out using a compound which is monofunctionally reactive under the stated conditions towards the hydroxyl groups of starch or of the starch ether and which is described by one of the general formulae which follow:

$R_1$ being $CH_3$ or H, $R_2$ being H and $R_3$ being $CH_3$, $CH_2$—OH, an N-methylene-acylamido group with 1 to 3 C atoms, an esterified N-methylene-carbamido or N-carboxymethylene-carbamido group with 2 to 7 C atoms; or $R_2$ and $R_3$ being $CH_3$ or $CH_2OH$ and $R_4$ and $R_5$ being H; or $R_4$ being H and $R_5$ being $CH_3$; or $R_4$ and $R_5$ being $CH_3$.

Alkali metal salts of carboxymethyl cellulose, having an increased absorption capacity and retention capacity, according to U.S. Pat. No. 3,678,031 (=DT-OS No. 2,151,973). Although the etherifying agents here employed contain carboxyl groups and would lead to a normally soluble cellulose ether, the conditions of the reaction are selected so that alkali metal salts of carboxymethylcellulose, having a D.S. of 0.4–1.2, a water soluble fraction of <35%, a water retention value (WRV) of about 1,000 to 7,000 and a salt water retention value of about 400 to about 2,500 are formed.

Water-insoluble carboxymethyl celluloses, such as are described in German Pat. No. 1,079,796, and DT-AS No. 1,151,474, i.e., those which have a D.S. of 0.05 to 0.3 and those which are substantially water-insoluble and likewise have a low D.S.

Water-insoluble, more highly polymerized carboxymethylcellulose or carboxyethylcellulose with a significant content of free carboxyl groups, according to British Pat. No. 725,887 (=German Pat. No. 1,037,076), which are rendered water-insoluble by heating the water-soluble acid compounds to 80° C. to 177° C.

Phosphorylated cellulose fibers, according to DT-OS No. 2,447,282, such as can be produced by a reaction of cellulose pulp with urea and phosphoric acid under the action of heat, a subsequent acid hydrolysis and ultimately a conversion into the form of a salt.

Dry, solid, water-insoluble absorbents, which are swellable with water, according to DT-OS No. 2,609,144, which consist of an ionic complex of a water-insoluble anionic polyelectrolyte and a cation of a metal which is at least 3-valent; suitable polyelectrolytes are polyacrylic acid, starch derivatives or cellulose derivatives.

Cellulose graft polymers, according to DT-OS No. 2,516,380, which are manufactured by grafting side chains of those polymer radicals onto the cellulose which are selected from the ionic and non-ionic polymer radicals. For example, polyacrylic acid, sodium polyacrylate, polymethacrylic acid, potassium polymethacrylate, polyvinyl alcohol sulfate, polyphosphoric acid, polyvinylamine, poly-(4-vinylpyridine), hydrolyzed polyacrylonitrile, polymethyl methacrylate, polyvinyl acetate, polystyrene or polybutadiene are suitable for this purpose.

Granulated, water-insoluble alkali metal carboxylate salts of starch/acrylonitrile graft copolymers, according to U.S. Pat. No. 3,661,815, which are manufactured by saponifying starch/acrylonitrile graft copolymers with a base in an aqueous-alkaline medium.

Modified cellulose material, having an improved retention capacity both for water and physiological fluids, according to DT-OS No. 2,528,555, which is manufactured by grafting an olefinically unsaturated, polymerizable monomer with hydrolyzable functional groups or a monomer carrying functional carboxyl groups onto a fibrous cellulose material and hydrolyzing the grafted product or treating the latter with alkali in other ways. In this process, the product is first converted to the state of maximum swelling, is then acidified to a pH value at which it is in the state of minimum swelling, is then converted to the form of a salt under conditions which do not effect swelling, and is finally dried.

Modified polysaccharide, according to DT-OS No. 2,647,420, manufactured from a polysaccharide, acrylamide, another vinyl monomer and a divinyl monomer, under the conditions of a free radical reaction.

Figure 5:
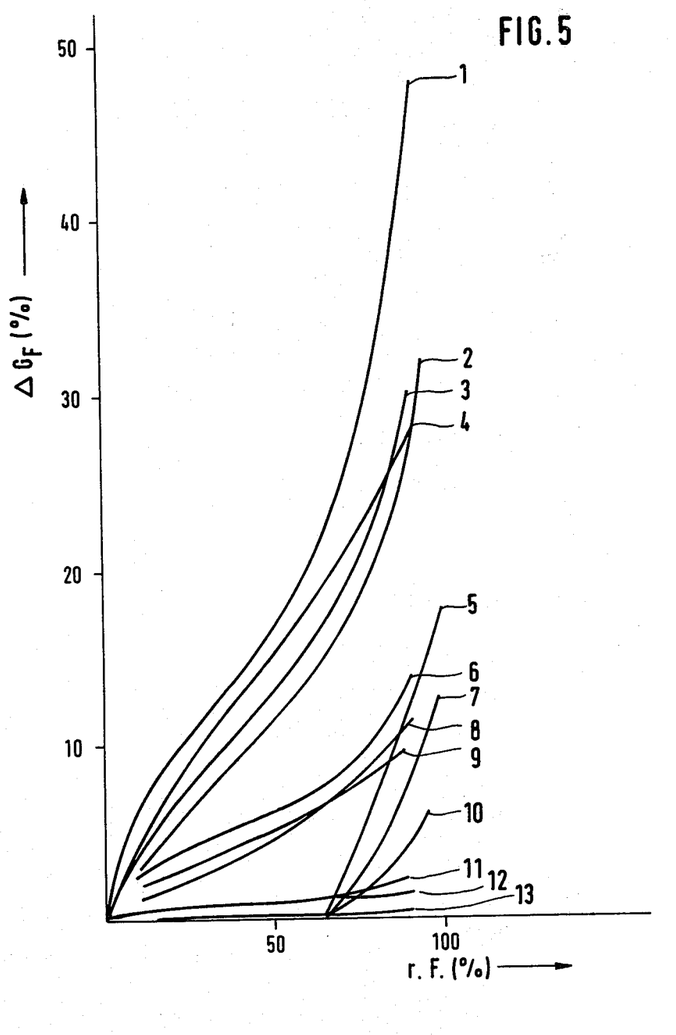
FIG. 5 shows the moisture absorption of various natural and synthetic materials as a function of the humidity in their surroundings; the moisture content $\Delta G_F$ of the sample, in % by weight, was plotted on the ordinate of the coordinate system, and the % relative humidity r. F. of the surroundings of the sample was plotted on the abscissa.

The numerals in FIG. 5 denote:
1. Tobacco
2. Velour leather and split leather
3. Chemically cross-linked CMC
4. Natural leather
5. PVC film + 30% of chemically cross-linked CMC
6. Cotton
7. PVC film + 20% of chemically cross-linked CMC
8. Gelatin
9. Filter paper
10. PVC film + 10% of chemically cross-linked CMC
11. Caron ®, trademark of Messrs. Hoechst AG (Germany)
12. Clarino ®, trademark of Messrs. Kuraray Co. Ltd., Kurashiki, Okayama (Japan)
13. PVC film.

The processes for the manufacture of sheet-like structures from PVC or a copolymer obtained with vinyl chloride (VC) are known. The sheet-like structure here can be a self-supporting film or it can be produced by coating or impregnating a base of natural or synthetic fiber material, non-woven textile materials or webs of synthetic resin. Preferably, the following bases are used for coating:

Woven or non-woven textile materials composed of one or more components, for example of synthetic fibers, such as polyamides, polyesters, polyacrylonitrile, PVC, polyolefins and polyamino acids, and also of glass fibers, regenerated fiber, such as viscose fibers, acetate fibers and the like, of natural fibers, such as cotton, silk, wool, linen and collagen obtained by abrading natural leather; or sheet-like materials which are composed of one or more components, for example of synthetic resins, such as polyamides, polyesters, polyacrylonitrile, PVC, polyolefins, and polyamino acids, or of natural leather, from which the silvery surface has been removed, or of collagen obtained from waste leather, natural rubber and synthetic rubber.

When carrying out the Examples, the two processes described in the following text were in particular (parts are parts by weight):

1. Heating (at about 170° C.) and molding of soft PVC powders by sintering, for example in the high-frequency process, to give films or coatings of other types (see, for example, Kunststoffhandbuch "Plastics Handbook", Volume II, part 2 page 69, et seq., 1963). A soft PVC powder of this type can, for example, consist of 58–65 parts of PVC (for example of K value 70), 42–30 parts of plasticizer (for example a phthalate plasticizer of medium gelling power), 0–5 parts of a viscosity reducer, 0.5–2 parts of stabilizers, 0.1–3 parts of pigments, and 20–10 parts of fillers.

2. Spread-coating of PVC pastes, in particular PVC plastisols (see, for example, Kuntstoffhandbuch "Plastics Handbook", Volume II, part 1, page 397 et seq. and 411 et seq., 1963).

A material of this type which can be used for spread-coating can have, for example, one of the following compositions (S-PVC=suspension PVC, E-PVC=emulsion PVC):

2.1 Base Coat
  53–56 parts of E(S)-PVC
  40–42 parts of phthalate plasticizer of medium gelling power (for example di-2-ethyl-hexyl phthalate or a mixture of this with diisononyl phthalate)
  4–5 parts of phthalate plasticizer of high gelling power (for example di-butyl phthalate)
  5–2% of heat stabilizer(s)
  0–x parts of pigment(s)
  0–5 parts of filler(s)

2.2 Filling coat or middle coat
  58–65 parts of E-PVC or S-PVC (K value of about 70)
  30–42 parts of plasticizer
  0–5 parts of viscosity reducer
  0.5–2% of stabilizer(s)
  0.1–3 parts of pigment(s)
  10–20 parts of filler(s)

2.3 Top coat
  65–70 parts of E-PVC (K valve of about 80)
  26–32 parts of plasticizer
  3–4 parts of viscosity reducer
  0.5–2% of stabilizer(s)
  0.1–3 parts of pigment(s)
  5–10 parts of fillers(s)

To manufacture the sheet-like structures according to the invention, the particles of at least one modified, swellable polymer are added, preferably in a proportion of 10 to 30% by weight, to the base compositions which are to be processed and which consist, for example of soft PVC powder or a soft VC copolymer powder or of a PVC paste or a VC copolymer paste, before shaping or spreading, and the particles are uniformly distributed therein; the mixture is then shaped or spread.

The sheet-like structures according to the invention have a high capacity for the absorption of water vapor and the transmission of water vapor, which far exceeds a mere transport effect by the incorporated particles. Furthermore, the sheet-like structures are also able to release the absorbed water vapor again under certain conditions, for example when placed under different climatic conditions.

Because the properties of the sheet-like structures are not merely the result of the significantly detectable effect of the addition of the particles of at least one swellable, modified polymer, but also depend, inter alia, on the thickness of the film or of the coating, the latter is advantageously prepared in a thickness of about 0.05 to 0.5 mm.

The sheet-like structures according to the invention, having the aforesaid properties, are suitable, for example, for use as a self-supporting film or as a coating on a base, in particular as a leather substitute (synthetic leather) for shoe upper material, upholstery covers, bag goods and outer garments (leather garments and all-weather garments) or as a covering, such as a tent material or a tarpaulin.

In FIG. 5 of the drawings, the behavior of the different natural and synthetic materials towards moisture is shown for comparison, in particular in such a way that the moisture content of the particular sample was measured as a function of the relative humidity acting on the sample at 20° C. This shows that chemically cross-linked carboxymethylcellulose, which represents a selected example of a modified swellable polymer, in combination with the measured moisture cycle according to Example 1, is very suitable for use in the materials according to the invention, in particular when these are used as a leather substitute under physiological conditions (for example as a shoe upper material or as an outer garment material).

The parameters used in the description and the examples for characterizing the sheet-like structures according to the invention and the swellable modified polymers present therein are to be understood as meaning the following:

WRV—Water retention capacity of the swellable modified polymer, in % by weight, measured against 1,600 times the acceleration due to gravity, relative to its water-insoluble fraction; WRV is determined after immersing the sample in water.

WUA—Water-insoluble fraction in the swellable modified polymer.

DS—Degree of substitution, i.e., the number of substituted hydroxyl groups on the anhydro-D-glucose units, from 0.0 to 3.0.

SV—Absorbency of the swellable modified polymer for a 1% by weight NaCl solution, in NaCl solution, in % by weight, relative to its total weight; SV is determined after 1% by weight aqueous NaCl solution has been absorbed by the sample up to saturation.

WA—The water absorption is determined by suspending the sample in liquid water.

$WDD_{PFI}$—Water vapor transmission rate (in accordance with W. Fischer and W. Schmidt, "Das Leder (Leather)", E. Roether-Verlag Darmstadt, 27, 87 et seq. (1976)). Inside the apparatus there is a temperature of 32° C., and the sample is under standard climatic conditions—unless otherwise stated—of 20° C./65% relative humidity, these conditions being always kept constant by means of a gentle stream of air from a fan mounted above the apparatus. The free testing surface is 10 cm$^2$. Inside the apparatus, the water at 32° C. and the atmosphere above the water, which is saturated with water vapor, are also kept in continuous motion with the aid of a magnetic stirrer. To determine the WDD, the weight loss of the test vessel with the sample is determined. WDD is expressed in mg/cm$^2$·x hours (in most cases x is 1, but it also can be 8 or 24).

$WDD_{DIN}$—Water vapor transmission rate, gravimetric process for determining the WDD (according to DIN 53,122 of November 1974; this factually agrees with ISO/R 1195-170 "Plastics, Determination of the water vapor transmission rate of plastics film and thin sheets, Dish Method"). A dish with an absorbent is sealed by the sample with the aid of wax and stored in moist climatic conditions. The amount of water vapor which is transmitted through the sample is calculated from the weight increase of the dish as soon as this increase becomes linear with time. The water vapor transmission rate WDD according to this standard is that amount of water vapor in g which is transmitted in 24 hours (1 day) under defined conditions (temperature, gradient of the atmospheric humidity) through 1 m² of surface area of the sample.

WDA—Water vapor absorption (see also WDD$_{PFI}$). The water vapor absorption is carried out simultaneously with the measurement of WDD$_{PFI}$, by determining the increase in weight of the sample; unless otherwise stated, the sample is permeable with respect to the outside climatic conditions, i.e., it is not covered.

Flexural strength—Measurement of the permanent flexural strength of light-weight leathers and their top layers (I.U.P./20 of the Internationale Union der Leder-Chemiker-Verbande "International Union of Associations of Leather Chemists", see "Das Leder (Leather)", E. Roether-Verlag, Darmstadt, 15, 87 (1964) and 26, 163 (1969)). The leather sample is folded and, in this state, its two ends are clamped into the test instrument. One clamp is stationary and the other moves to and fro, so that the fold moves up and down along the leather sample. The leather sample is tested at intervals in order to establish whether damage has occurred thereon. The test can be carried out with dry samples, conditioned samples or samples which have been moistened in a certain way. The dry experiment is intended to test the leather and its finishing. The wet experiment solely serves to assess the finishing.

Tensile strength—Measurement of the tensile strength in a tensile test (according to DIN 53,328 of December 1970, which factually agrees with the I.U.P./6 process of the Internationale Union der Leder-Chemiker-Verbande "International Union of Associations of Leather Chemists", see "Das Leder (Leather)", E. Roether-Verlag Darmstadt, 10, 14 (1959)). The tensile strength $\rho_B$ is the quotient of the measured maximum force in kp and the initial cross-section of the sample in cm².

The invention will be further illustrated by reference to the following specific examples:

EXAMPLE 1

Figure 1:
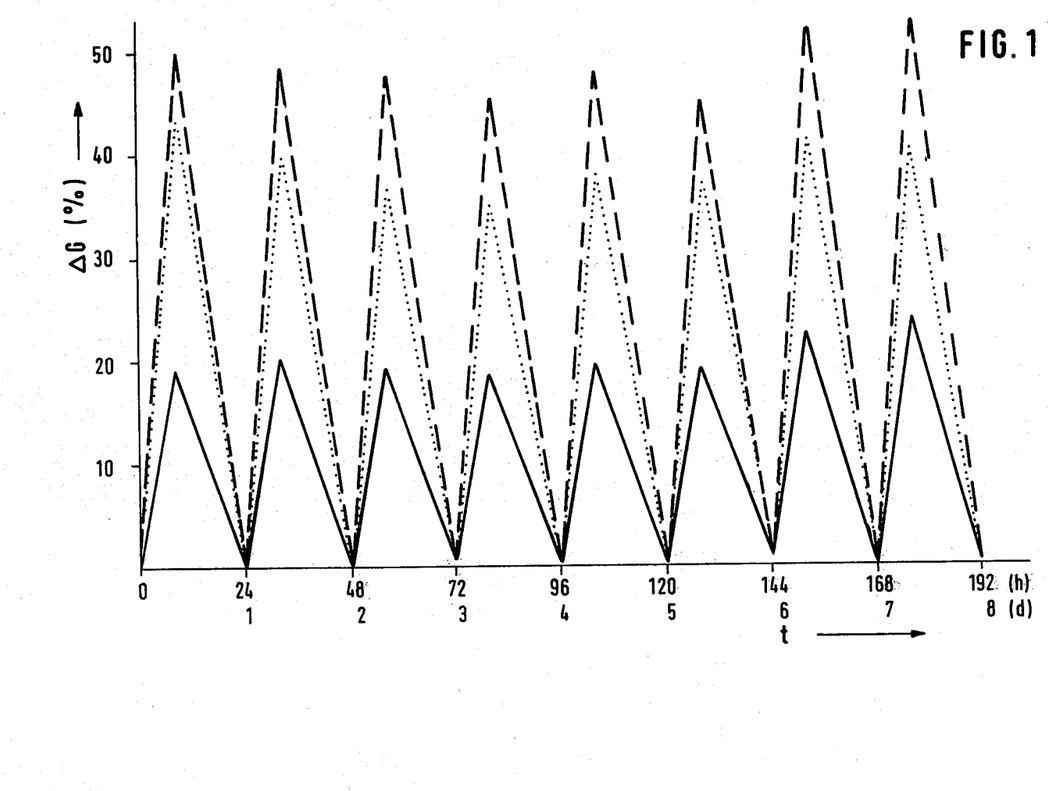
FIG. 1 shows the moisture cycle of various swellable, modified polymers over a period of several days; the weight increase $\Delta G$, in % by weight, was plotted on the ordinate of the coordinate system, and the time t in hours (h) or days (d) was plotted on the abscissa.

The moisture cycles of three different swellable, modified polymers are investigated over a period of several days. A certain amount of the polymer is first stored for at least 24 hours under standard climatic conditions (temperature of 23° C., 50% relative atmospheric humidity) and weighed. In a constantly recurring rhythm, the procedure is then as follows: the polymer sample is kept for 8.0 hours under moist climatic conditions (temperature 30° C., 100% relative atmospheric humidity), is weighed, is then again kept for 16.0 hours under the standard climatic conditions (23° C., 50% relative atmospheric humidity) and is weighed again. The measured values obtained are plotted in a coordinate system (FIG. 1); the increase in weight in % by weight is recorded on the ordinate and the time in hours is recorded on the abscissa. The line designated as — in FIG. 1 represents the moisture cycle of a mixture cross-linked with bisacrylamido-acetic acid, of a quaternary cellulose-ammonium salt and cellulose, having WRV=1,160, WUA=98 and SV=950, the line designed as --- represents the moisture cycle of a mixture of carboxymethyl starch and carboxymethylcellulose hydrate, each cross-linked with bisacrylamido-acetic acid, having WRV=11,250, WUA=85.1 and SV=1,920, and the line designated as ···· represents the moisture cycle of a carboxymethylcellulose, cross-linked with bisacrylamidoacetic acid, having WRV=3,270 and WUA=97. The comparison of the individual moisture cycles shows that the moisture absorbed by the particular swellable, modified polymer can be repeatedly released again under certain conditions. This property is of great importance for, for example, the incorporation of these polymers into films which can be used in shoe upper material or for sheet-like structures of other types; this is because, for example, a shoe is worn for a certain time during which the shoe upper material is provided from the inside with a certain amount of moisture by the foot; during rest periods (for example during the night) the shoe upper material should be able to release this moisture again to its surroundings.

EXAMPLES 2 TO 5

The water absorption (WA) values or the water vapor absorption (WDA) values of 0.5 mm thick films, prepared from grey or brown PVC powder with varying proportions of a swellable, modified polymer, are determined (see Table I). The WA was determined by suspending the film in water, and the WDA was determined under climatic conditions of 32° C. and 100% relative humidity. The flexural strength of the modified films is high in the case of those of Examples 2–4 (up to 120,000 folds without cracks), and in those according to Example 5 the flexural strength is poor (cracks already starting at 500 folds). The tensile strength is reduced only by about 15% in the case of the films according to Examples 2–4, and in the films prepared according to Example 5 it is reduced rather more.

EXAMPLES 6 TO 23

The WA values or WDA values of 0.3 mm thick films, prepared from PVC with different types of a swellable, modified polymer, are determined (see Table II). The WA was determined by suspending the film in water, and the WDA was determined under different climatic conditions.

Examples 6 to 14: films from PVC plastisol
Examples 16 to 19: films from brown PVC powder
Examples 20 to 23: films from brown PVC powder with an additon of 3% by weight of blowing agent.

EXAMPLES 24 TO 28

The WA values, the tensile strength and the flexural strength of films (0.3 mm), prepared from PVC plastisol (Examples 24 to 27) or grey PVC powder (Example 28) and with the addition of varying amounts of a swellable, modified polymer, are determined and compared with those of films without such an addition (see Table III).

EXAMPLES 29 TO 31

The values of the water vapor transmission rate WDD$_{PFI}$ and, in some cases, the WDA values of 0.1 mm thick (Examples 29 and 30) or 0.3 mm thick (Example 31) films, prepared from brown PVC powder with the addition of varying amounts of a swellable, modified polymer, are determined and compared with those of leather (see Table IV).

EXAMPLE 32

Figure 2:
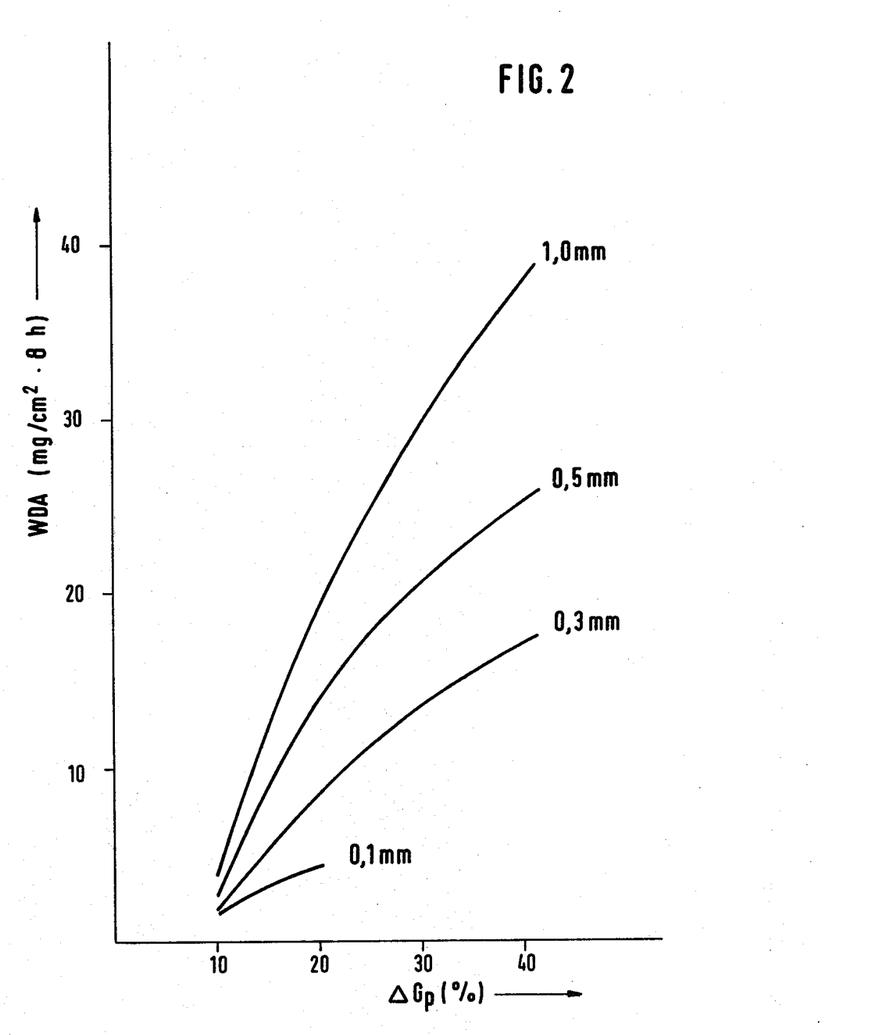
FIG. 2 shows the water vapor absorption WDA of sheet-like structures according to the invention, as a function of the quantitative proportion of the swellable, modified polymer in the sheet-like structure (in each case at a constant layer thickness); the water vapor absorption WDA in mg/cm$^2$·8 hours was plotted on the ordinate of the coordinate system, and the proportion of the swellable, modified polymer $\Delta G_p$, in % by weight, was plotted on the abscissa.
Figure 3:
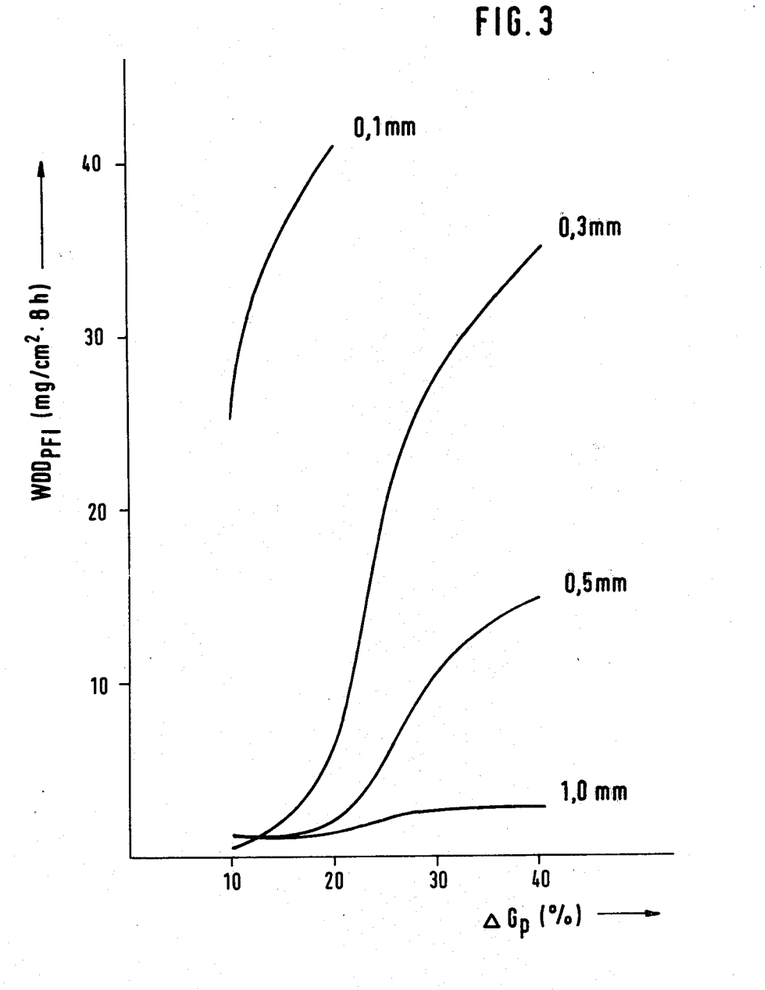
FIG. 3 shows the water vapor transmission rate $WDD_{PFI}$ of sheet-like structures according to the invention, as a function of the quantitative proportion of the swellable, modified polymer in the sheet-like structure (in each case at a constant layer thickness); the water vapor transmission rate $WDD_{PFI}$ in mg/cm$^2$·8 hours was plotted on the ordinate of the coordinate system, and the proportion of the swellable, modified polymer $\Delta G_p$, in % by weight, was plotted on the abscissa.
Figure 4:
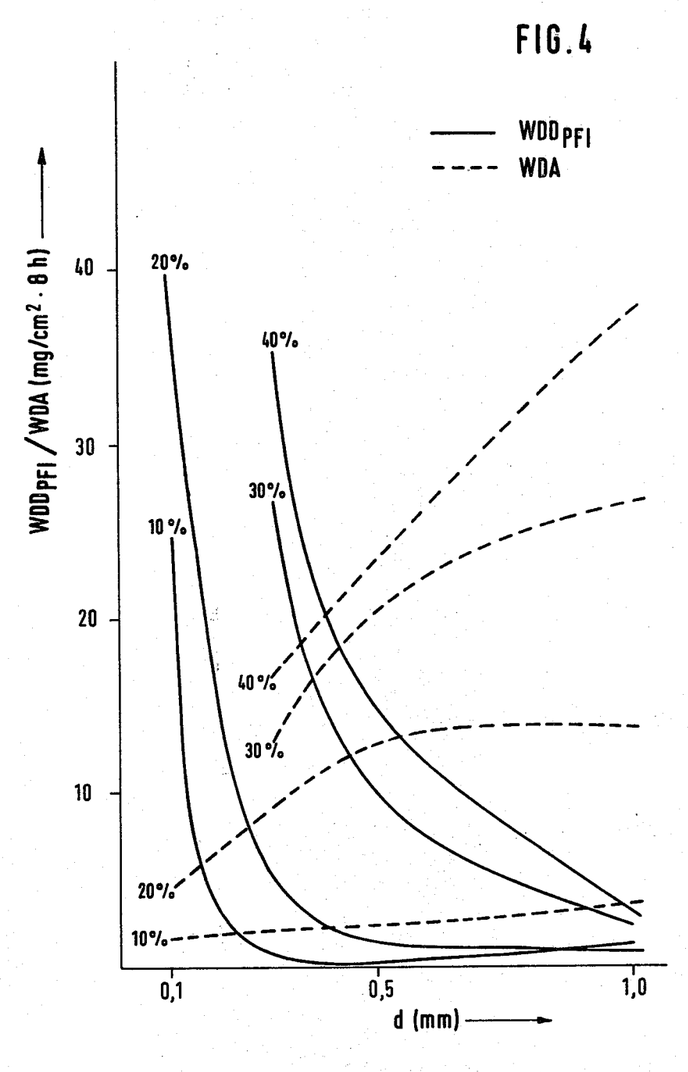
FIG. 4 shows the WDA values and the $WDD_{PFI}$ values as a function of the layer thickness (in each case with a constant proportion of swellable, modified polymer); the WDA values or the $WDD_{PFI}$ values in mg/cm$^2$·8 hours were plotted on the ordinate of the coordinate system, and the layer thickness d in mm was plotted on the abscissa.

The water vapor absorption (WDA) and the water vapor transmission rate (WDD$_{PFI}$) of films prepared from PVC plastisol are determined as a function of the layer thickness of the film and a proportion of a swellable, modified polymer (CMC crosslinked with bisacrylamidoacetic acid and having DS=1.02, WRV=542, WUA=83.8, and SV=1,130, sieved to a fineness of ≦125μ). In the coordinate system of FIG. 2, the values of the water vapor absorption (WDA) are plotted on the ordinate, and the quantitative proportion of swellable, modified polymer in the film is plotted on the abscissa. It is apparent that the water vapor absorption rises both with an increasing proportion of additive and with increasing layer thickness. However, according to FIG. 3, the water vapor transmission rate (WDD$_{PFI}$) rises indeed with an increasing proportion of additive, but it falls with increasing layer thickness. If the two measurements (see FIG. 4) are directly compared with one another graphically, it can be seen that there is a correlation, which in an individual case can be determined within certain ranges, between the parameters layer thickness and proportion of swellable, modified polymers. Thus, it appears to be hardly sensible, for example, to increase the layer thickness of the film to significantly more than 0.5 mm, and likewise the proportion of swellable, modified polymers should most advantageously be in the range from about 10 to 30% by weight, inter alia also in order not to modify the mechanical properties of the film excessively.

EXAMPLES 33 TO 40

The WDA values and WDD$_{PFI}$ values (see Table V) of 0.2 mm thick films from PVC plastisol with an identical added amount of swellable, modified polymers are determined under various climatic condtions (Examples 33 to 36). In Examples 37 to 40, the amount added is varied and moreover, although the polymer used is of the same chemical type, the pH of the liquid precipitant medium (the manufacture of the cross-linked CMC is carried out under alkaline conditions and acetic acid is subsequently added to the reaction medium, see, for example, U.S. Pat. No. 3,936,411 (=DT-OS No. 2,357,079) is adjusted not to a pH value of 6, as in Examples 33 to 36, but to a pH value of 8. In particular, these particles of cross-linked CMC (Examples 37 to 40) can be more readily incorporated mechanically into the film composition.

COMPARATIVE EXAMPLES V1 TO V10

The water vapor absorption (WDA) values and water vapor transmission rate (WDD$_{PFI}$) values of 0.2 mm thick films, prepared from PVC plastisol and having various additions of unmodified carbohydrates or carbohydrate derivatives, are determined (see Table VI), in order to prove in particular that the results, obtained in the preceding examples on the films according to the invention, are not to be ascribed to a mere transport effect of the incorporated particles of modified, swellable polymers.

EXAMPLES 41 TO 44 AND COMPARATIVE EXAMPLES V11 to V13

The WDA values and WDD$_{PFI}$ values of 0.2 mm thick films, prepared from PVC plastisol with a addition of a modified swellable polymer, are determined in measuring periods of varying lengths (Table VII, Examples 41 to 44).

It is found here that, above all, the water vapor transmission rate, and also the water vapor absorption (one measurement being exceptional) rise with an increasing duration of measurement not only in absolute terms but also when reduced to the same base time (1 hour). For comparison, the WDA values and WDD$_{PFI}$ values of commercially available materials (V11 to V13) are listed.

EXAMPLES 45, 46 AND COMPARATIVE EXAMPLES V14 to V22

The water vapor transmission rate (WDD) values, obtained by a different method, of 0.2 mm thick films, prepared from PVC plastisol without an addition (V14), with an addition according to the invention (Examples 45, 46) and with an addition not according to the invention (V15 to V22) are determined. The values determined by this method also show that the increased water vapor transmission rate of the films according to the invention cannot be ascribed to a mere transport effect of the incorporated particles.

EXAMPLES 47 TO 55

The water vapor absorption (WDA) and the water vapor transmission rate (WDD$_{PFI}$) of 0.2 mm thick films, prepared from PVC plastisol with an addition of swellable modified polymers of the most diverse type, are determined (see Table IX). The comparison of these results with, for example, those of Table VI (addition of particles of unmodified carbohydrates) also shows again the significant increase.

TABLE I

| Example | Swellable, modified polymer | | | | | | | WA (%) within a period of | | | WDA at 32° C./100% relative humidity |
| | Type | Modifier | Quantity % | DS | WRV | WUA | SV | 1 hour | 4 hours | 24 hours | (mg/cm$^2$ . hour) |
| --- | --- | --- | --- | --- | --- | --- | --- | --- | --- | --- | --- |
| 2 (grey PVC) | Carboxy-methyl-starch (CMS) | bis-acrylamido-acetic acid (cross-linked) | 10 | — | 2,700 | 92.2 | 1,600 | — | — | — | 5.0 |
| 3 (grey PVC) | CMS | bis-acrylamido-acetic acid (cross-linked) | 20 | — | " | " | " | 4.8 | 7.8 | 17.7 | — |
| 4 (brown PVC) | CMS | bis-acrylamido-acetic acid (cross-linked) | 20 | — | " | " | " | 6.5 | 9.2 | 23.2 | — |
| 5 (grey PVC) | carboxy-methyl-cellulose (CMC) | vinylsulfon-amide (uncross-linked) | 10 | 0.42 | 17,040 | 52.4 | 1,230 | — | — | — | 7.7 |
| grey or brown PVC without | — | — | — | — | — | — | — | — | — | 0 | 0 |

TABLE I-continued

| Example | Swellable, modified polymer | | | | | | | WA (%) within a period of | | | WDA at 32° C./100% relative humidity |
|---|---|---|---|---|---|---|---|---|---|---|---|
| | Type | Modifier | Quantity % | DS | WRV | WUA | SV | 1 hour | 4 hours | 24 hours | (mg/cm². hour) |
| an addition | | | | | | | | | | | |

TABLE II

| Example | Swellable, modified polymer | | | | | | | WA in % | | WDA 32° C. 100% relative humidity (mg/cm². 8 hours) | at 20° C., 65% relative humidity in % | |
|---|---|---|---|---|---|---|---|---|---|---|---|---|
| | Type | Modifier | Quantity % | DS | WRV | WUA | SV | 1 day | 3 days | | 1st day | 2nd day |
| 6 | CMS | bis-acrylamido acetic acid (cross-linked) | 25 | 0.67 | 3,800 | 87.7 | 1,800 | 16.7 | 22.2 | 4.6 | 0.62 | 0.59 |
| 7 | CMS | bis-acrylamido acetic acid (cross-linked) | 25 | — | 2,700 | 92.2 | 1,600 | 16.8 | 23.7 | 4.2 | 0.74 | 0.74 |
| 8 | carboxy-methyl-cellulose hydrate | bis-acrylamido acetic acid (cross-linked) | 25 | 0.37 | 8,720 | 67.2 | 980 | 71.6 | 74.7 | 25.7 | 0.66 | 0.57 |
| 9 | CMC | N-methylol-acrylamide (un-cross-linked) | 25 | 0.60 | 2,020 | 91.2 | — | 86.7 | 90.2 | 25.9 | 0.88 | 0.79 |
| 10 | CMC | bis-acrylamido acetic acid (cross-linked) | 25 | 0.21 | 381 | 90.9 | 800 | 23.6 | 23.9 | 14.9 | 0.66 | 0.60 |
| 11 | CMC | vinylsulfon-amide (un-cross-linked) | 25 | 0.42 | 17,040 | 52.4 | 1,230 | 79.5 | 78.0 | 23.3 | 0.87 | 0.68 |
| 12 | CMC*) | bis-acrylamido acetic acid (cross-linked) | 25 | 0.74 | 7,640 | 76.4 | 800 | 59.3 | 61.7 | 26.2 | 1.19 | 1.14 |
| 13 | CMC**) | bis-acrylamido acetic acid (cross-linked) | 25 | 0.74 | 7,640 | 76.4 | 800 | 56.4 | 59.2 | 20.9 | 1.13 | 1.05 |
| 14 | CMC*) | bis-acrylamido acetic acid (cross-linked) | 25 | 1.02 | 542 | 83.8 | 1,130 | 49.9 | 51.8 | 26.8 | 1.25 | 1.19 |
| 15 | CMC**) | bis-acrylamido acetic acid (cross-linked) | 25 | 1.02 | 542 | 83.8 | 1,130 | 51.9 | 55.3 | 24.9 | 1.24 | 1.14 |
| 16 | CMC*) | bis-acrylamido acetic acid (cross-linked) | 25 | 0.74 | 7,640 | 76.4 | 800 | 51.9 | 54.5 | 19.3 | 1.05 | 0.96 |
| 17 | CMC**) | bis-acrylamido acetic acid (cross-linked) | 25 | 0.74 | 7,640 | 76.4 | 800 | 51.9 | 54.5 | 17.7 | 1.08 | 0.94 |
| 18 | CMC*) | bis-acrylamido acetic acid (cross-linked) | 25 | 1.02 | 542 | 83.8 | 1,130 | 46.6 | 51.1 | 17.2 | bis-acrylamido- | 0.95 |
| 19 | CMC**) | bis-acrylamido acetic acid (cross-linked) | 25 | 1.02 | 542 | 83.8 | 1,130 | 47.7 | 51.1 | 17.7 | 1.10 | 1.08 |
| 20 | CMC*) | bis-acrylamido acetic acid (cross-linked) | 25 | 0.74 | 7,640 | 76.4 | 800 | 55.0 | 56.3 | 18.6 | 1.07 | 0.99 |
| 21 | CMC**) | bis-acrylamido acetic acid (cross-linked) | 25 | 0.74 | 7,640 | 76.4 | 800 | 53.1 | 55.0 | 18.8 | 0.99 | 0.89 |
| 22 | CMC*) | bis-acrylamido acetic acid (cross-linked) | 25 | 1.02 | 542 | 83.8 | 1,130 | 45.6 | 47.7 | 18.2 | 1.01 | 0.99 |
| 23 | CMC**) | bis-acrylamido acetic acid (cross-linked) | 25 | 1.02 | 542 | 83.8 | 1,130 | 47.2 | 49.2 | 19.6 | 1.02 | 0.94 |

*) The swellable, modified polymer is employed after sieving to a fineness of ≦ 125μ.
**) The swellable, modified polymer is employed after sieving to a fineness of ≦ 200μ.

TABLE III

| Example | Swellable, modified polymer Type | Modifier | Quantity % | DS | WRV | WUA | SV | WA in % 1 day | WA in % 2 days | Tensile strength $\sigma_B$ | Flexural strength as the number of folds |
|---|---|---|---|---|---|---|---|---|---|---|---|
| 24 | CMS | bis-acrylamido-acetic acid (cross-linked) | 10 | — | 2,700 | 92.2 | 1,600 | 4.0 | 4.1 | 3.8 | good at 150,000 |
| 25 | CMS | bis-acrylamido-acetic acid (cross-linked) | 20 | — | 2,700 | 92.2 | 1,600 | 7.3 | 7.5 | 2.6 | cracks at 105,000 |
| 26 | CMS | bis-acrylamido-acetic acid (cross-linked) | 30 | — | 2,700 | 92.2 | 1,600 | 22.6 | 22.5 | 2.8 | cracks at 120,000 |
| 27 | CMS | bis-acrylamido- (cross-linked) | 40 | — | 2,700 | 92.2 | 1,600 | 39.6 | 39.7 | 0.8 | cracks at 110,000 |
| PVC plastisol without an addition | — | — | — | — | — | — | — | 0 | 0 | 4.6 | good at 150,000 |
| 28 | CMS | bis-acrylamido-acetic acid (cross-linked) | 10 | — | 2,700 | 92.2 | 1,600 | 4.7 | 4.9 | 3.8 | cracks at 105,000 |
| PVC powder without an addition | — | — | — | — | — | — | — | 0 | 0 | 4.9 | good at 150,000 |

TABLE IV

| Example | Swellable, modified polymer Type | Modifier | Quantity % | DS | WRV | WUA | SV | $WDD_{PFI}$ mg/cm². 1 hour | WDA (%) without cover | WDA (%) with cover |
|---|---|---|---|---|---|---|---|---|---|---|
| 29 | CMC | bis-acrylamido-acetic acid (cross-linked) | 10 | 1.02 | 542 | 83.8 | 1,130 | 3.4 | 1.83 | 2.81 |
| 30 | CMC | bis-acrylamido-acetic acid (cross-linked) | 20 | 1.02 | 542 | 83.8 | 1,130 | 5.1 | 4.52 | 16.90 |
| 31 | CMC | bis-acrylamido-acetic acid (cross-linked) | 20 | 1.02 | 542 | 83.8 | 1,130 | 0.6 | — | — |
| Leather | — | — | — | — | — | — | — | 0.75 –3.0 | — | — |
| Leather with a finishing layer | — | — | — | — | — | — | — | 3.0 | — | — |
| Velour leather | — | — | — | — | — | — | — | 15 | — | — |

TABLE V

| Example | Swellable, modified polymer Type | Modifier | Quantity % | DS | WRV | WUA | SV | WDA (mg/cm² .8 hours) | Climatic Conditions inside | Climatic Conditions outside | $WDD_{PFI}$ (mg/cm² .8 hours) | $WDD_{PFI}$ (mg/cm² .1 hour) |
|---|---|---|---|---|---|---|---|---|---|---|---|---|
| 33 | CMC | bis-acrylamido acetic acid (cross-linked) | 20 | 1.02 | 542 | 83.8 | 1,130 | 12.49 | 32° C. 100% r.h.* | 20° C. 65% r.h. | 14.80 | 1.85 |
| 34 | CMC | bis-acrylamido acetic acid (cross-linked) | 20 | 1.02 | 542 | 83.8 | 1,130 | 7.26 | 32° C. 100% r.h. | 32° C. 65% r.h. | 6.71 | 0.84 |
| 35 | CMC | bis-acrylamido acetic acid (cross-linked) | 20 | 1.02 | 542 | 83.8 | 1,130 | 2.75 | 20° C. 100% r.h. | 20° C. 65% r.h. | 1.15 | 0.14 |
| 36 | CMC | bis-acrylamido acetic acid (cross-linked) | 20 | 1.02 | 542 | 83.8 | 1,130 | 11.62 | 32° C. 100% r.h. | 10° C. 65% r.h. | 14.41 | 1.81 |
| 37 | CMC | bis-acrylamido acetic acid (cross-linked) | 10 | 1.02 | 542 | 83.8 | 1,130 | 3.92 | 32° C. 100% r.h. | 20° C. 65% r.h. | 2.28 | 0.29 |

TABLE V-continued

| Example | Swellable, modified polymer Type | Modifier | Quantity % | DS | WRV | WUA | SV | WDA (mg/cm² . 8 hours) | Climatic Conditions inside | outside | WDD$_{PFI}$ (mg/cm² . 8 hours) | (mg/cm² . 1 hour) |
|---|---|---|---|---|---|---|---|---|---|---|---|---|
| 38 | CMC | bis-acrylamido acetic acid (cross-linked) | 15 | 1.02 | 542 | 83.8 | 1,130 | 5.69 | 32° C. 100% r.h. | 20° C. 65% r.h. | 2.69 | 0.34 |
| 39 | CMC | bis-acrylamido acetic acid (cross-linked) | 20 | 1.02 | 542 | 83.8 | 1,130 | 12.78 | 32° C. 100% r.h. | 20° C. 65% r.h. | 10.10 | 1.25 |
| 40 | CMC | bis-acrylamido acetic acid (cross-linked) | 25 | 1.02 | 542 | 83.8 | 1,130 | 11.40 | 32° C. 100% r.h. | 20° C. 65% r.h. | 22.48 | 2.81 |

*Relative humidity

TABLE VI

| Comparative Examples | Addition to the sheet-like Structure Type | Particle size | Quantity (%) | WDA (mg/cm² . 8 hours) | WDD$_{PFI}$ (mg/cm² . 8 hours) | (mg/cm² . 1 hour) |
|---|---|---|---|---|---|---|
| V 1 | cellulose powder | ≦ 125μ | 10 | 0.45 | 0.85 | 0.11 |
| V 2 | cellulose powder | ≦ 50μ | 20 | 1.45 | 1.62 | 0.22 |
| V 3 | cellulose powder | 50μ (92%) | 10 | 0.34 | 1.16 | 0.15 |
| V 4 | cellulose powder | 50μ (92%) | 20 | 0.96 | 1.15 | 0.14 |
| V 5 | cellulose powder | ≦ 32μ (96%) | 10 | 0.34 | 4.38 | 0.55 |
| V 6 | cellulose powder | ≦32μ (96%) | 20 | 0.91 | 1.11 | 0.14 |
| V 7 | maize starch | ≦ 100μ | 10 | 0.30 | 4.59 | 0.57 |
| V 8 | maize starch | " | 20 | 0.44 | 2.52 | 0.31 |
| V 9 | Dextran* three-dimensionally cross-linked | 20-80μ | 10 | 0.42 | 1.53 | 0.19 |
| V 10 | Dextran* three-dimensionally cross-linked | " | 20 | 1.42 | 1.65 | 0.18 |

*Sephadex ® G25, registered trademark of AB Pharmacia, Uppsala (Sweden)

TABLE VII

| Example | Swellable, modified polymer Type | Modifier | Quantity (%) | DS | WRV | WUA | SV | WDA (mg/cm²) | Duration of the measurements ← (hours) → | WDD$_{PFI}$ (mg/cm²) | (mg/cm² . 1 hour) |
|---|---|---|---|---|---|---|---|---|---|---|---|
| 41 | CMC | bis-acrylamido acetic acid (cross-linked) | 20 | 1.02 | 542 | 83.8 | 1,130 | 11.20 | 8 | 14.91 | 1.86 |
| 42 | CMC | bis-acrylamide acetic acid (crosslinked) | 20 | 1.02 | 542 | 83.8 | 1,130 | 9.33 | 6 | 9.00 | 1.50 |
| 43 | CMC | bis-acrylamido acetic acid (cross-linked) | 20 | 1.02 | 542 | 83.8 | 1,130 | 5.83 | 4 | 5.79 | 1.45 |
| 44 | CMC | bis-acrylamido acetic acid (cross-linked) | 20 | 1.02 | 542 | 83.8 | 1,130 | 6.67 | 2 | 1.71 | 0.86 |
| V 11[1] | — | — | — | — | — | — | — | 25.7 | 8 | 27.5 | 3.44 |
| V 12[2] | — | — | — | — | — | — | — | 18.8 | 8 | 10.4 | 1.30 |
| V 13[3] | — | — | — | — | — | — | — | — | 8 | 8-12 | 1-1.5 |

[1] Aniline leather for shoe upper material
[2] Unmodified polyurethane shoe upper material
[3] Leather with a finishing coat for shoe upper material Table VIII

| Example | Addition to the sheet-like structure Type | Quantity | WDD$_{DIN}$ (g/m².24 hours) | (g/m².1 hour) | Climatic conditions Temperature (°C.) | Relative humidity (%) |
|---|---|---|---|---|---|---|
| V 14 | — | — | 15.6 | 0.65 | 23 | 85 |
| 45 | CMC having DS = 1.02, cross-linked with bis-acrylamido-acetic acid, WRV =0 542, WUA = 83.8, SV = 1,130, particle size ≦ 125μ | 10 | 17.4 | 0.73 | 23 | 85 |
| 46 | CMC having a DS = 1.02, cross-linked with bis-arylamido-acetic acid, WRV = 542, WVA = 83.8, SV= 1.130, particle size = 125μ | 20 | 44.2 | 1.84 | 23 | 85 |
| V 15 | unmodified cellulose of a particle size of 92% ≦ 50μ | 10 | 14.8 | 0.62 | 23 | 85 |
| V 16 | particle size of 92% ≦ 50 μ | 20 | 13.0 | 0.54 | 23 | 85 |
| V 17 | unmodified cellulose of a particle size of 92% ≦ 50μ | 20 | 26.3 | 1.09 | 32 | 85 |
| V 18 | unmodified cellulose of a particle size of 96% ≦ 32μ | 20 | 15.3 | 0.64 | 23 | 85 |
| V 19 | unmodified cellulose of a Particle size of 96% ≦ 32 μ | 20 | 26.4 | 1.09 | 32 | 85 |
| V 20 | unmodified maize starch of a particle size of ≦ 100μ | 10 | 14.9 | 0.62 | 23 | 85 |
| V 21 | particle size of ≦ 100μ | 20 | 18.1 | 0.75 | 23 | 85 |
| V 22 | unmodified maize starch of a particle size of ≦ 100μ | 20 | 36.1 | 1.50 | 32 | 85 |

TABLE IX

| Example | Swellable, modified polymer Type | Modifier | Quantity (%) | DS | WRV | WUA | SV | WDD$_{PFI}$ (mg/cm².8 hours) | (mg/cm².1 hour) | WDA (mg/cm².8 hours) |
|---|---|---|---|---|---|---|---|---|---|---|
| 47 | CMC | epichlorohydrin (cross-linked) | 15 | 0.75 | 4,400 | 73.8 | 1,500 | 11.73 | 1.47 | 13.24 |
| 48 | polyacrylamide (Separan ®)* | cross-linked | 15 | — | 117,000 | 50.0 | 3,500 | 23.18 | 2.88 | — |
| 49 | acrylic acid (Viscaron ®)** | tetraallyl-oxyethane (cross-linked) | 15 | — | 20,300 | 33.4 | 1,150 | 4.02 | 0.50 | 1.83 |
| 50 | cellulose phosphate | — | 10 | — | 4,650 | 86.0 | 1,320 | 20.09 | 2.52 | — |
| 51 | CMC - highly etherified | thermally cross-linked | 15 | — | 9,000 | 41.0 | — | 3.35 | 0.42 | 5.21 |
| 52 | CMC - highly etherified | thermally cross-linked | 15 | — | 3,000 | 81.0 | — | 6.02 | 0.75 | 3.94 |
| 53 | CMC | thermally cross-linked under acid conditions | 10 | — | 1,900 | 89.0 | 1,080 | 6.48 | 0.81 | 2.22 |
| 54 | CMC | thermally cross-linked under acid conditions | 10 | — | 820 | 81.0 | 1,050 | 11.10 | 1.39 | 2.33 |
| 55 | CMC | bis-acrylamido-acetic acid (cross-linked) | 15 | 1.02 | 542 | 83.8 | 1,130 | — | 2.05 | 6.0 |

*Registered trademark of DOW CHEMICAL (USA)
**Registered trademark of Protex (France)

It will be obvious to those skilled in the art that many modifications may be made within the scope of the present invention without departing from the spirit thereof, and the invention includes all such modifications.

What is claimed is:

1. In a sheet-like structure of polyvinyl chloride or a copolymer of vinyl chloride, which is capable of absorbing water vapor and transmitting water vapor, with a uniformly incorporated additive,
   the improvement comprising that said additive is composed of polymeric particles of at least one modified starch ether or cellulose ether, which has been modified by cross-linking, effected by means of heat energy, radiation or an additional chemical compound, which is insoluble in water to the extent of at least 50% by weight, and which is swellable in aqueous liquids.

2. A sheet-like structure as claimed in claim 1, wherein said additional chemical compound is selected from the group consisting of phosphorus oxychloride, dichloroacetic acid and a compound which carries the following group which is reactive towards hydroxyl groups:

the acrylamido group, $R_1$ being H or $CH_3$, or an α-halogenoepoxy group, Hal being Cl or Br, or $-\overline{N}=C\diagdown_{Cl}$ the chloro-azomethine group, or the allyloxy-azomethine group.

3. A sheet-like structure as claimed in claim 1 which comprises about 10 to 30% by weight of additive.

* * * * *